US006830312B2

(12) United States Patent
Muramatsu et al.

(10) Patent No.: US 6,830,312 B2
(45) Date of Patent: Dec. 14, 2004

(54) WIRE-DRIVING SYSTEM, AND IMAGE READER USING SUCH WIRE-DRIVING SYSTEM

(75) Inventors: Shigeki Muramatsu, Shizuoka (JP); Tooru Uchida, Shizuoka (JP); Kouichi Furutou, Tokyo (JP); Kaname Nagatani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/443,815

(22) Filed: May 23, 2003

(65) Prior Publication Data

US 2003/0231223 A1 Dec. 18, 2003

(30) Foreign Application Priority Data

Jun. 13, 2002 (JP) ........................................ 2002-172975

(51) Int. Cl.[7] ............................ B41J 23/00; G03B 27/52
(52) U.S. Cl. ........................................ 347/37; 355/55
(58) Field of Search ............................. 347/37; 355/48, 355/55; 399/201, 211, 212; 250/234; 33/1 M

(56) References Cited

U.S. PATENT DOCUMENTS

| | | | | |
|---|---|---|---|---|
| 4,420,886 A | * | 12/1983 | Amano .......................... | 33/1 M |
| 4,901,113 A | * | 2/1990 | Sawayama et al. .......... | 399/201 |
| 5,063,676 A | * | 11/1991 | Gerber .......................... | 33/1 M |
| 5,289,000 A | * | 2/1994 | Toyofuku ...................... | 250/234 |

FOREIGN PATENT DOCUMENTS

| | | |
|---|---|---|
| JP | 60-114848 A | 6/1985 |
| JP | 2-146861 A | 6/1990 |

* cited by examiner

Primary Examiner—Hai Pham
(74) Attorney, Agent, or Firm—Sughrue Mion, PLLC

(57) ABSTRACT

In a wire-driving system that drives and moves a movable unit along a guide path, a drive drum member is rotatably provided on the movable unit to be rotated around an axis which is perpendicular to a movement direction of the movable unit. An electric drive motor is provided in the movable unit and operationally connected to the drum member to be rotationally driven in either a first rotational direction or a second rotational direction. A wire cable has a first end and a second end, and is partially wound around the drum member such that a first cable section and a second cable section are extended from the drum member. The respective first and second ends of the wire cable are securely attached to two fixed points beside terminal ends of the guide path such that the first and second cable sections of the wire cable are tensionally extended along the guide path. The respective first and second cable sections of the wire cable are wound around and unwound from the drum member during the rotation of the drum member in the first rotational direction by the drive source, and the respective first and second cable sections of the wire cable are unwound from and wound around the drum member during the rotation of the drum member in the second rotational direction by the drive source, resulting in the movement of the movable unit along the guide path.

13 Claims, 11 Drawing Sheets

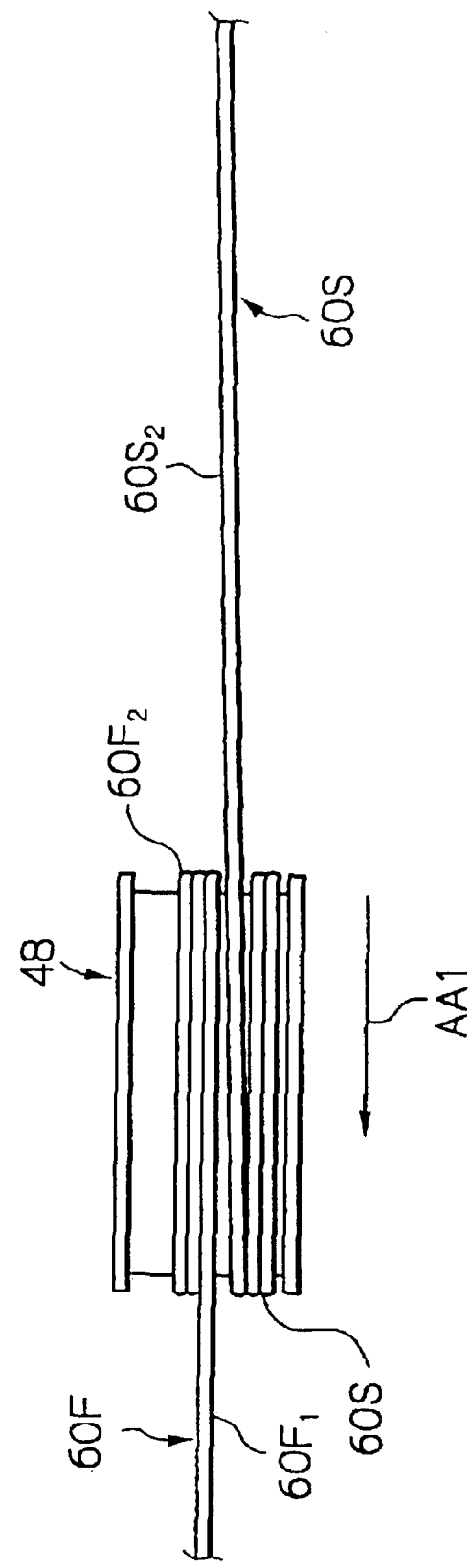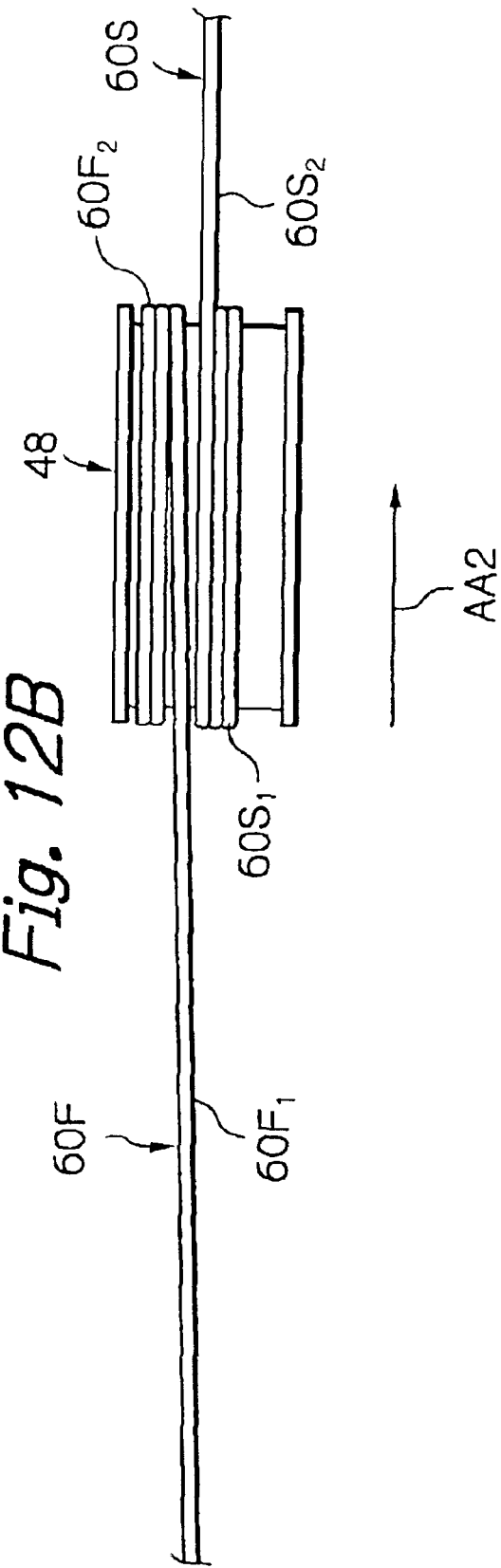

WIRE-DRIVING SYSTEM, AND IMAGE READER USING SUCH WIRE-DRIVING SYSTEM

BACKGROUND OF THE INVENTION

1. Field of the Invention

The present invention relates to a wire-driving system which is utilized in various machines, such as a copying machine, an image scanner, a facsimile machine, a printer and so on, to drive and move a movable unit along a guide path. Also, the present invention relates to an image reader including an elongated image scanner unit which is moved by such a wire-driving system.

2. Description of the Related Art

Conventionally, a basic principle of such a wire-driving system resides in traction or pulling of a movable unit with a wire cable. For example, in order to pull and move the movable unit along a guide path, the wire-driving system includes a pair of pulleys provided at the terminal ends of the guide path, and an endless wire cable entrained by and stretched between the pulleys, with a part of the endless wire cable being securely attached to the movable unit. One of the pulleys functions as a drive pulley operationally connected to an electric drive motor, and thus it is possible to move the movable unit along the guide path by rotationally driving the drive pulley with the electric drive motor.

Accordingly, before the wire-driving system can be assembled in a machine, such as a copying machine, an image scanner, a facsimile machine, a printer or the like, a wide space for accommodating the wire-driving system has to be prepared in the machine, resulting in a bulky construction of the machine due to the arrangement of the pulleys, the electric drive motor and so on.

A wire-drive system is frequently used in a copying machine to drive an optical scanning unit along a pair of parallel guide rails, as disclosed in Japanese Laid-Open Patent Publications (KOKAI) No. SHO-60-114848 and No. HEI-02-146861. In general, the optical scanning unit has an elongated configuration, and is laid across the pair of parallel guide rails. Thus, in order for the elongated optical scanning unit to be stably and smoothly moved along the parallel guide rails, the elongated optical scanning unit must be pulled at the ends thereof, using two endless wire cables. Namely, it is necessary to arrange the respective endless wire cables along the guide rails, and further the endless wire cables have to be synchronously driven to ensure the stable and smooth movement of the elongated optical scanning unit along the guide rails.

Thus, the machine, using the wire-driving system for driving the elongated movable unit, necessarily becomes more bulky and complicated.

SUMMARY OF THE INVENTION

Therefore, an object of the present invention is to provide a wire-driving system which can be compactly and simply arranged in various machines, such as a copying machine, an image scanner, a facsimile machine, a printer and so on, to drive and move a movable unit along a guide path.

Another object of the present invention is to provide a wire-driving system which can be compactly and simply arranged in a machine including an elongated movable unit, such as a copying machine, an image scanner, a facsimile machine, a line printer or the like, to stably and smoothly drive and move the elongated movable unit along a wide guide path.

Yet another object of the present invention is to provide an image reader including an elongated image scanner unit which is moved by such a wire-driving system, whereby the image reader can be compactly constructed.

In accordance with a first aspect of the present invention, there is provided a wire-driving system that drives and moves a movable unit along a guide path. The wire-driving system comprises a drive drum member rotatably provided on the movable unit so as to be rotated around a rotational axis which is perpendicular to a movement direction of the movable unit, a drive source provided in the movable unit and operationally connected to the drive drum member so as to be rotationally driven in either a first rotational direction or a second rotational direction, and a wire cable having a first end and a second end, and partially wound around the drive drum member such that a first cable section and a second cable section are extended from the drive drum member. The respective first and second ends of the wire cable are securely attached to two fixed points beside terminal ends of the guide path such that the first and second cable sections of the wire cable are tensionally extended along the guide path. The respective first and second cable sections of the wire cable are wound around and unwound from the drive drum member during the rotation of the drive drum member in the first rotational direction by the drive source, and the respective first and second cable sections of the wire cable are unwound from and wound around the drive drum member during the rotation of the drive drum member in the second rotational direction by the drive source, resulting in the movement of the movable unit along the guide path.

Preferably, the wire cable is securely attached to the drive drum member at a middle point between the first and second ends of the wire cable such that the respective first and second cable sections are defined as respective ones extending from the middle point to the first and second ends of the wire cable, the respective first and second cable sections of the wire cable being wound around the drive drum member in reverse directions with respect to each other.

A movement range, in which the movable unit is moved along the guide path, may be equivalent to a length of the winding turns of the wire cable around the drive drum member.

In accordance with a second aspect of the present invention, there is provided a wire-driving system that drives and moves an elongated movable unit along a guide path defined by a first side and a second side opposite to each other. The wire-driving system comprises a drive drum member rotatably provided on a first end of the elongated movable unit so as to be rotated around a rotational axis which is perpendicular to a movement direction of the elongated movable unit, a drive source provided in the elongated movable unit and operationally connected to the drive drum member so as to be rotationally driven in either a first rotational direction or a second rotational direction, a first wire cable having a first end and a second end, and partially wound around the drive drum member such that a first cable section and a second cable section are extended from the drive drum member, and a second wire cable having a first end and a second end, and partially wound around the drive drum member such that a first cable section and a second cable section are extended from the drive drum member. The first end of the first wire cable and the second end of the second wire cable are securely attached to two fixed points beside terminal ends of the first side of the guide path such that the first cable section of the first wire cable and the second cable section of the second wire cable are tensionally extended along the first side of the guide path. The wire-driving system further comprises a wire-cable deflector provided on a second end of the elongated movable unit such that the second cable section of the first wire cable and the first cable section of the second wire cable are threaded through the wire-cable deflector so as to laterally traverse the guide path, whereby the second end of the first wire cable and the first end of the second wire cable are securely attached to two fixed points beside ends of the second side of the guide path such that the second cable section of the first wire cable and the first cable section of the second wire cable are tensionally extended along the second side of the guide path. Both the first cable sections of the first and second wire cables and both the second cable sections of the first and second wire cables are respectively wound around and unwound from the drive drum member during the rotation of the drive drum member in the first rotational direction by the drive source, and both the first cable sections of the first and second wire cables and both the second cable sections of the first and second wire cables are respectively unwound from and wound around the drive drum member during the rotation of the drive drum member in the second rotational direction by the drive source, resulting in the movement of the elongated movable unit along the guide path.

Preferably, the first wire cable is securely attached to the drive drum member at a middle point between the first and second ends of the first wire cable such that the first and second cable sections are defined as respective ones extending from the middle point to the first and second ends of the first wire cable, and the respective first and second cable sections of the first wire cable are wound around the drive drum member in reverse directions with respect to each other. Also, preferably, the second wire cable is securely attached to the drive drum member at a middle point between the first and second ends of the second wire cable such that the first and second cable sections are defined as respective ones extending from the middle point to the first and second ends of the second wire cable, and the respective first and second cable sections of the second wire cable are wound around the drive drum member in reverse directions with respect to each other.

A length of the winding turns of the first wire cable may be equal to that of the winding turns of the second wire cable. In this case, a movement range, in which the elongated movable unit is moved along the guide path, is equivalent to the length of the winding turns of each wire cable around the drive drum member.

Preferably, the wire-cable deflector comprises first and second pulleys, each of which is rotatable around a rotational axis parallel with the rotational axis of the drive drum member, and a third pulley which is rotatable around a rotational axis perpendicular to the rotational axis of the drive drum member. The second cable section is threaded through the first and third pulleys, and is deflected such that the end of the second cable section is securely attached to the corresponding fixed point. The first cable section is threaded through the second and third pulleys, and is deflected so as to be wound around the drive drum member.

Preferably, the first and second wire cables are orderly wound around the drive drum member such that the winding and unwinding of the first wire cable and the winding and unwinding of the second wire cable do not interfere with each other. In this case, both the first cable sections of the first and second wire cables may be wound around the drive drum member such that the winding turns of first cable sections are shifted in one direction along the rotational axis of the drive drum member, and both the second cable sections of the first and second wire cable may be wound around the drive drum member such that the winding turns of the second cable section are shifted in a reverse direction along the rotational axis of the drive drum member. With the arrangement, the two adjacent cable sections of the first and second wire cables can be wound around and unwound from the drive drum member when the drive drum member is driven in the first rotational direction, and the two adjacent cable sections of the first and second wire cables can be unwound from and wound around the drive drum member when the drive drum member is driven in the second rotational direction.

In accordance with a third aspect of the present invention, there is provided an image reader which comprises an elongated image scanner unit that is movable along a guide path defined by a first side and a second side opposite to each other, a drive drum member rotatably provided on a first end of the elongated image scanner unit so as to be rotated around a rotational axis which is perpendicular to a movement direction of the elongated image scanner unit, a drive source provided in the elongated image scanner unit and operationally connected to the drive drum member so as to be rotationally driven in either a first rotational direction or a second rotational direction, a first wire cable having a first end and a second end, and partially wound around the drive drum member such that a first cable section and a second cable section are extended from the drive drum member, a second wire cable having a first end and a second end, and partially wound around the drive drum member such that a first cable section and a second cable section are extended from the drive drum member. The first end or the first wire cable and the second end of the second wire cable are securely attached to two fixed points beside terminal ends of the first side of the guide path such that the first cable section of the first wire cable and the second cable section of the second wire cable are tensionally extended along the first side of the guide path. The image reader further comprises a wire-cable deflector provided on a second end of the elongated image scanner unit such that the second cable section of the first wire cable and the first cable section of the second wire cable are threaded through the wire-cable deflector so as to laterally traverse the guide path, and the second end of the first wire cable and the first end of the second wire cable are securely attached to two fixed points beside ends of the second side of the guide path such that the second cable section of the first wire cable and the first cable section of the second wire cable are tensionally extended along the second side of the guide path. Both the first cable sections of the first and second wire cables and both the second cable sections of the first and second wire cables are respectively wound around and unwound from the drive drum member during the rotation of the drive drum member in the first rotational direction by the drive source, and both the first cable sections of the first and second wire cables and both the second cable sections of the first and second wire cables are respectively unwound from and wound around the drive drum member during the rotation of the drive drum member in the second rotational direction by the drive source, resulting in the movement of the elongated image scanner unit along the guide path.

Preferably, the image reader further comprises a pair of guide rails on which the elongated image scanner unit is slidably mounted, such that the elongated image scanner unit is movable along the guide path.

BRIEF DESCRIPTION OF THE DRAWINGS

The above objects and other objects will be more clearly understood from the description set forth below, with reference to the accompanying drawings, wherein:

FIG. 12A is an elevation view of the drive drum member for explaining how the first and second wire cables are orderly wound around and unwound from the drive drum member when the drive dram is driven in one rotational direction; and FIG. 12B is an elevation view of the drive drum member for explaining how the first and second wire cables are orderly wound around and unwound from the drive drum member when the drive dram is driven in the reverse rotational direction.

DESCRIPTION OF THE PREFERRED EMBODIMENTS

Figure 1:
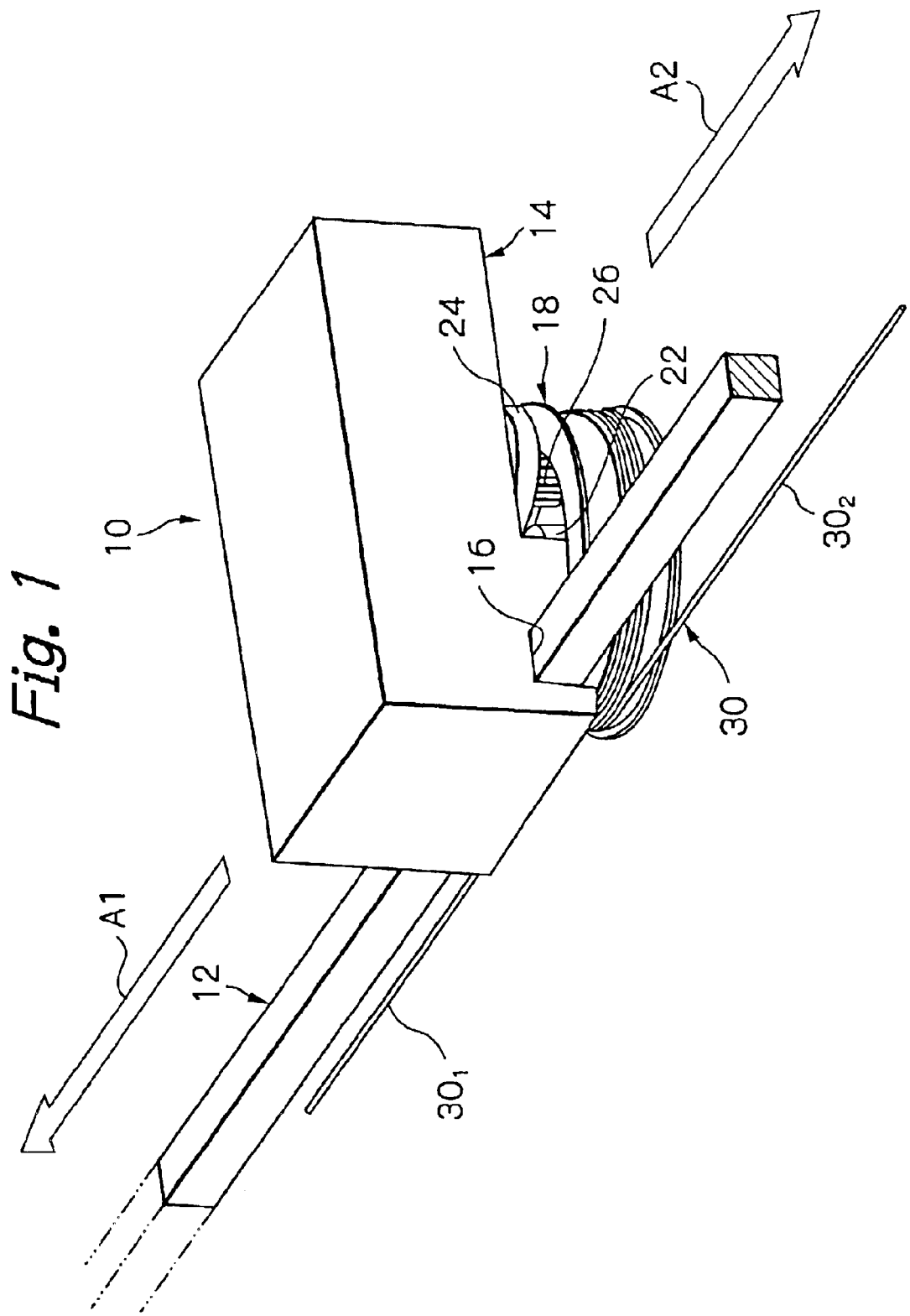
FIG. 1 is a perspective view of a principal part of an ink jet printer in which a wire-driving system according to the present invention is embodied as a first embodiment.

With reference to FIG. 1, a principal part of an ink jet printer is illustrated in a perspective view, and a wire-driving system according to the present invention is embodied as a first embodiment in the ink jet printer.

In FIG. 1, reference 10 indicates a printing head unit for the ink jet printer, and the printing head unit 10 is slidably mounted on a rectangular guide rail 12 so as to be moved along a guide path defined by the rectangular guide rail 12, with the guide path being represented by arrows A1 and A2 in FIG. 1. In particular, the printing head unit 10 includes a frame housing 14 which has a rectangular groove 16 for receiving the guide rail 12. Although not visible, for example, roller bearings are provided in the rectangular groove 16 so as to be engaged with the rectangular guide rail 12, whereby the printing head unit 10 can be smoothly run along the guide rail 12.

Note, of course, although the printing head unit 10 has an ink jet printing head provided in the frame housing 14, an explanation of the ink jet printing head is omitted because the ink jet printing head per se does not form a part of the present invention.

Figure 2:
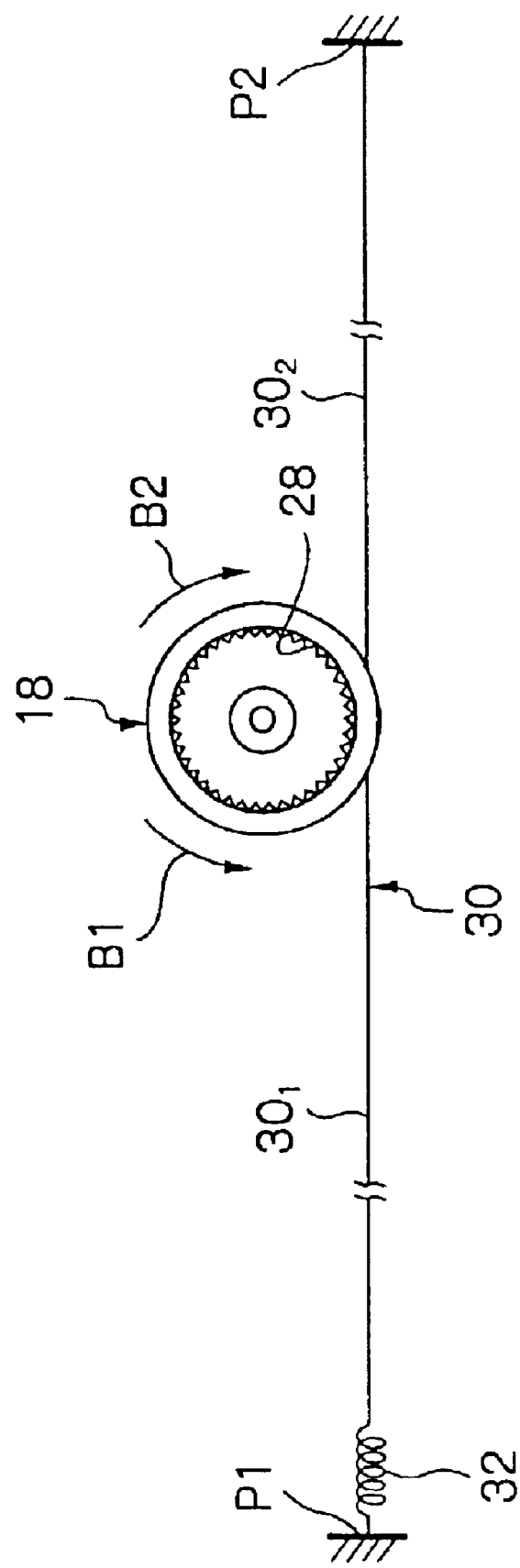
FIG. 2 is a schematic plan view showing a whole arrangement of the first embodiment of the wire-driving system according to the present invention.

With reference to FIG. 2, a whole arrangement of the first embodiment of the wire-driving system according to the present invention is schematically shown.

Figure 3:
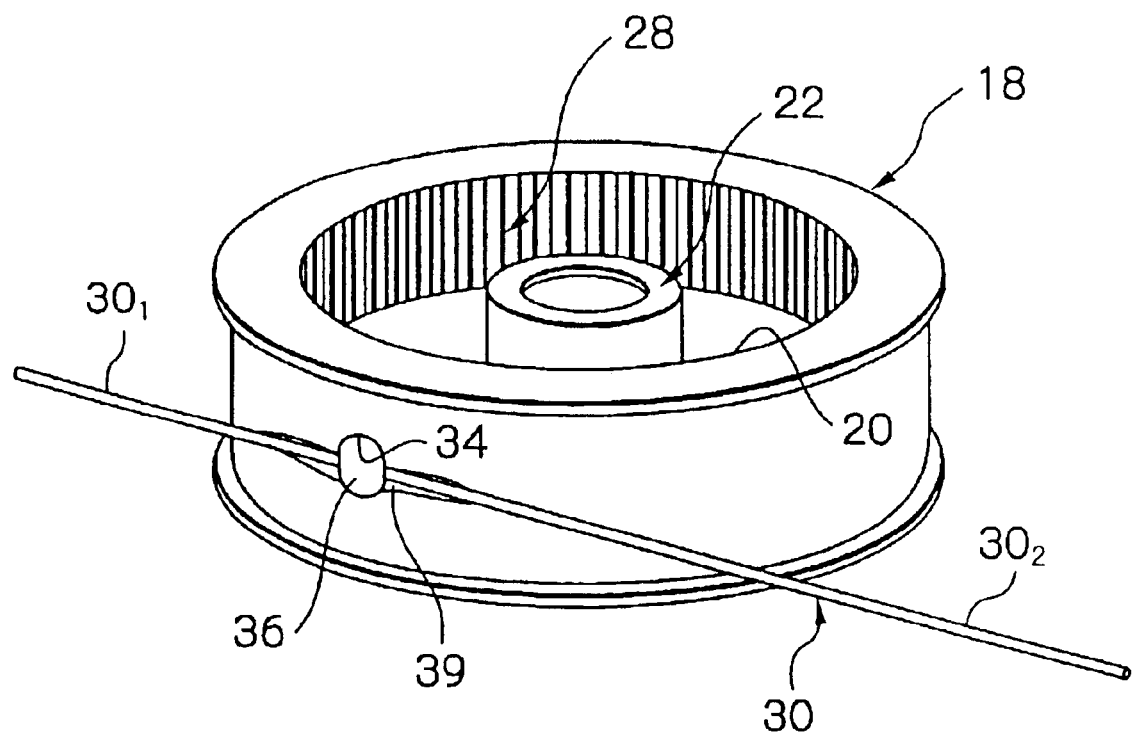
FIG. 3 is a perspective view of a drive drum member forming a part of the first embodiment of the wire-driving system.

The wire-driving system includes a drive drum member 18, which is rotatably provided on a bottom of the frame housing 14 beside the rectangular guide rail 12, as shown in FIG. 1. In particular, as best shown in FIG. 3, an annular recess 20 is formed in the drive drum member 18 such that a central hub 22 is defined therein, and the central hub 22 is rotatably mounted on a vertical shaft (not visible in FIG. 1), which is protruded from the bottom of the frame housing 14. Namely, the drive drum member 18 is rotatable around the longitudinal axis of the aforesaid vertical shaft, which is perpendicular to the guide path (A1, A2) of the printing head unit 10.

As shown in FIG. 1, the wire-driving system also includes an electric drive motor 24 securely supported by the bottom of the frame housing 14, and a pinion 26 is securely mounted on an output shaft of the electric drive motor 24. On the other hand, as best shown in FIG. 3, the drive drum member 18 has an inner annular gear 28 formed in a peripheral wall of the annular recess 20, and the pinion 26 is engaged with the inner annular gear 28, whereby the drive drum member 18 is rotationally driven by the electric drive motor 24.

As shown in FIG. 2, the wire-driving system also includes wire cable 30, which is partially wound around the drive drum member 18 such that a first cable section $30_1$ and a second cable section $30_2$ are extended from the drive drum member 18, as best shown in FIG. 1, and the first and second cable sections $30_1$ and $30_2$ are tensionally stretched along the rectangular guide rail 12, and therefore, the guide path (A1, A2). Namely, as shown in FIG. 2, an end of the first cable section $30_1$ is securely attached to a first fixed point P1 through the intermediary of a spring tensioner 32, and an end of the second cable section $30_2$ is securely attached to a second fixed point P2, thereby ensuring the tensional stretch of the wire cable 30 due to the provision of the spring tensioner 32.

Note, in this first embodiment, the first and second fixed points P1 and P2 are presented by a frame structure of the ink jet printer, and are selected such that the first and second cable sections $30_1$ and $30_2$ are stretched in parallel to the rectangular guide rail 12.

Preferably, before the wire cable 30 is wound around the drive drum member 18, as shown in FIG. 3, the wire cable 30 is securely attached to the drive drum member 18 at a middle point between the ends thereof, such that the first and second cable section $30_1$ and $30_2$ are defined as respective ones extending from the middle point to the ends of the wire cable 30. For the secure attachment of the wire cable 30 to the drive drum member 18, as shown in FIG. 3, a hemispherical recess 34 is formed in an outer peripheral wall of the drive drum member 18, and a hemispherical plug element 36 is inserted into the hemispherical recess 34.

Figure 4:
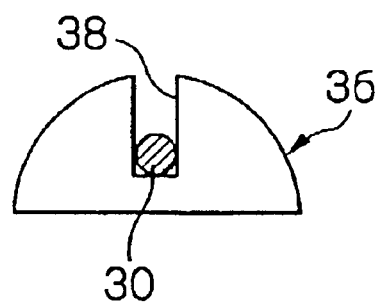
FIG. 4 is an elevation view of a hemispherical plug element which is used to securely attach a wire cable to the drive drum member shown in FIG. 3.

In particular, as shown in FIG. 4, the hemispherical plug element 36 has a groove 38 for receiving the wire cable 30, and a width of the groove 38 is somewhat smaller than a diameter of the wire cable 30 so that the wire cable 30 is forcibly put in the groove 38 of the plug element 36. Thus, since the wire cable 30 is prevented from easily slipping out the groove 38 of the plug element 36, it is possible to ensure the secure attachment of the wire cable 30 to the drive drum member 18 by inserting the plug element 36 together with the wire cable 30 into the hemispherical recess 34.

As shown in FIG. 3, a groove 39 is formed in the outer peripheral wall of the drive drum member 18 so as to cross the hemispherical recess 34, and thus the wire cable 30 is prevented from being subjected to shearing stress when the plug element 36 with the wire cable 30 is inserted into the hemispherical recess 34 because the wire cable 30 is received in the groove 39.

After the insertion of the plug element 36 with the wire cable 30 into the hemispherical recess 34, the respective first and second cable sections $30_1$ and $30_2$ of the wire cable 30 are wound around the drive drum member 18 in reverse directions with respect to each other, as shown in FIG. 1.

With the above-mentioned arrangement, for example, when the drive drum member 18 is rotationally driven by the electric drive motor 24 in a counterclockwise direction indicated by an arrow B1 in FIG. 2, the respective first and second cable sections $30_1$ and $30_2$ of the wire cable 30 are wound around and unwound from the drive drum member 18, and thus the printing head unit 10 is moved along the guide rail 12 in the direction indicated by the arrow A1. On the other hand, when the drive drum member 18 is rotationally driven by the electric drive motor 24 in a clockwise direction indicated by an arrow B2 in FIG. 2, the respective first and second cable sections $30_1$ and $30_2$ of the wire cable 30 are unwound from and wound around the drive drum member 18, and thus the printing head unit 10 is moved along the guide rail 12 in the direction indicated by the arrow A2.

A movement range, in which the printing head unit 10 can be moved along the guide path (A1, A2), is determined by winding turns of the wire cable 30 around the drive drum member 18. Namely, the movement range of the printing head unit 10 is equivalent to a total of both a length of the winding turns of the first cable section $30_1$ and a length of the winding turns of the second cable section $30_2$.

For example, when the printing head unit 10 is positioned at a center between the terminal ends of the movement range (i.e. the guide path), the length of the winding turns of the first cable section $30_1$ and the length of the winding turns of the second cable section $30_2$ are equal to each other, and each length corresponds to one half of the movement range. Also, when the printing head unit 10 is positioned at one of the terminal ends of the movement range, one of the first and second cable sections $30_1$ and $30_2$ is completely unwound from the drive drum member 18, and the length of the winding turns of the other cable section ($30_1$, $30_2$) corresponds to the full movement range.

Figure 5:
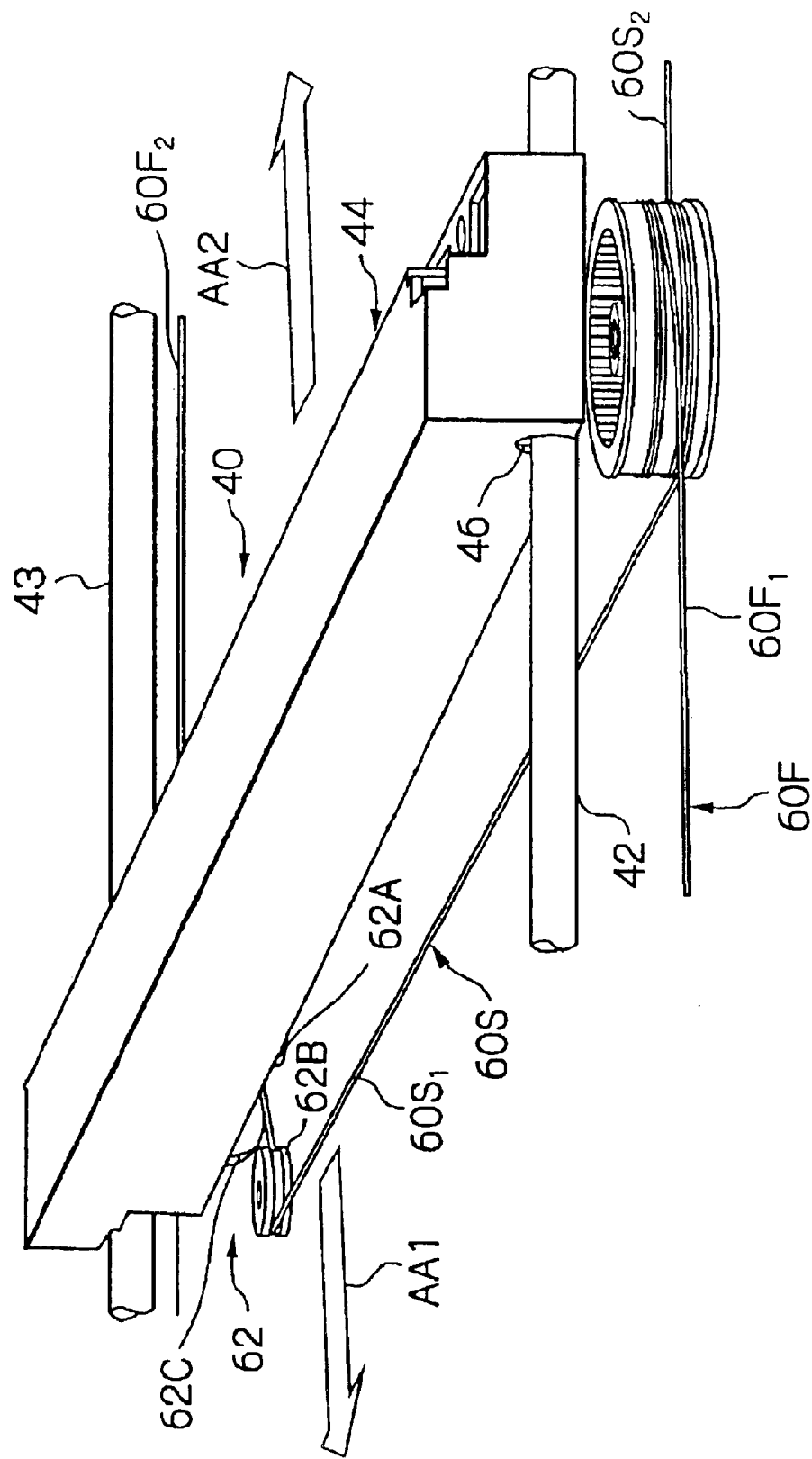
FIG. 5 is a perspective view of a principal part of an image reader in which a wire-driving system according to the present invention is embodied as a second embodiment.

With reference to FIG. 5, a principal part of an image reader is illustrated in a perspective view, and a wire-driving system according to the present invention is embodied as a second embodiment in the image scanner. Also, with reference to FIG. 6, the principal part of the image reader is illustrated in an elevation view.

Figure 6:
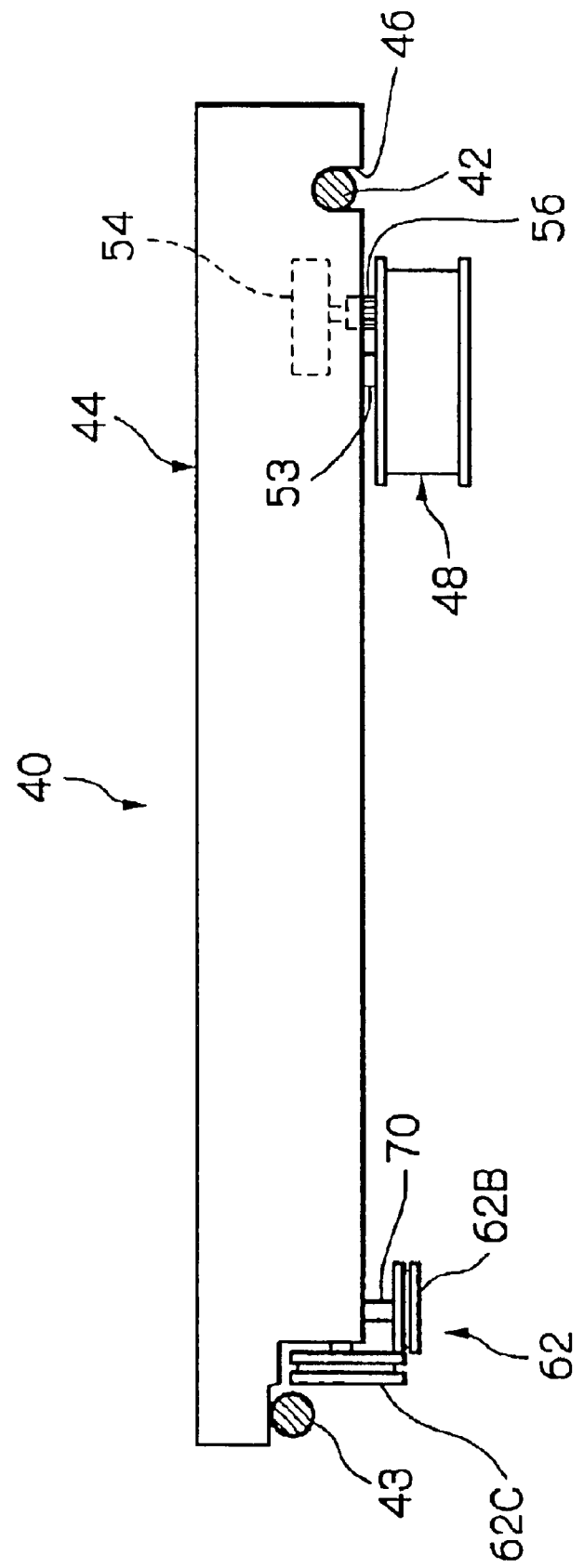
FIG. 6 is an elevation view of the principal part of the image reader shown in FIG. 5.

In FIGS. 5 and 6, reference 40 indicates an image scanner unit for the image reader, and the image scanner unit 40 is slidably mounted on a pair of guide rails 42 and 43 so as to be moved along a guide path defined by the guide rails 42 and 43, with the guide path being represented by arrow AA1 and AA2 in FIG. 5. Namely, the image reading unit 10 has an elongated configuration so as to be laid across the pair of parallel guide rails 42 and 43.

In particular, the image scanner unit 40 includes a frame housing 44 having a groove 46 formed at its one end to slidably receive the guide rail 42, and the other end of the frame housing 44 is rested on the guide rail 43, whereby the image scanner unit 40 can be run along the guide rails 42 and 43. Similar to the aforesaid first embodiment, roller bearings may be provided in the groove 46 so as to be engaged with the guide rail 42 for the smooth running of the image scanner unit 40 along the guide path (AA1, AA2).

Although not illustrated in FIGS. 5 and 6, the image reader includes a transparent glass plate spaced above the image scanner unit 40 in parallel with the guide path (AA1, AA2), and an object (such as a manuscript, a picture or the like) to be read is placed on the transparent glass plate. Also, although not illustrated or not visible in FIGS. 5 and 6, the image scanner unit 40 includes an elongated lamp, an optical focusing lens system, and an line image sensor. For example, while the image scanner unit 40 is moved along the guide rails 42 and 43 in the direction indicated by the arrow AA1, the object is illuminated by the elongated lamp, and the illuminated object is focused on the line image sensor through the optical focusing lens system. Namely, during the movement of the image scanner unit 40, the object is scanned with the line image sensor of the image scanner unit 40, to thereby read image information from the object.

Figure 7:
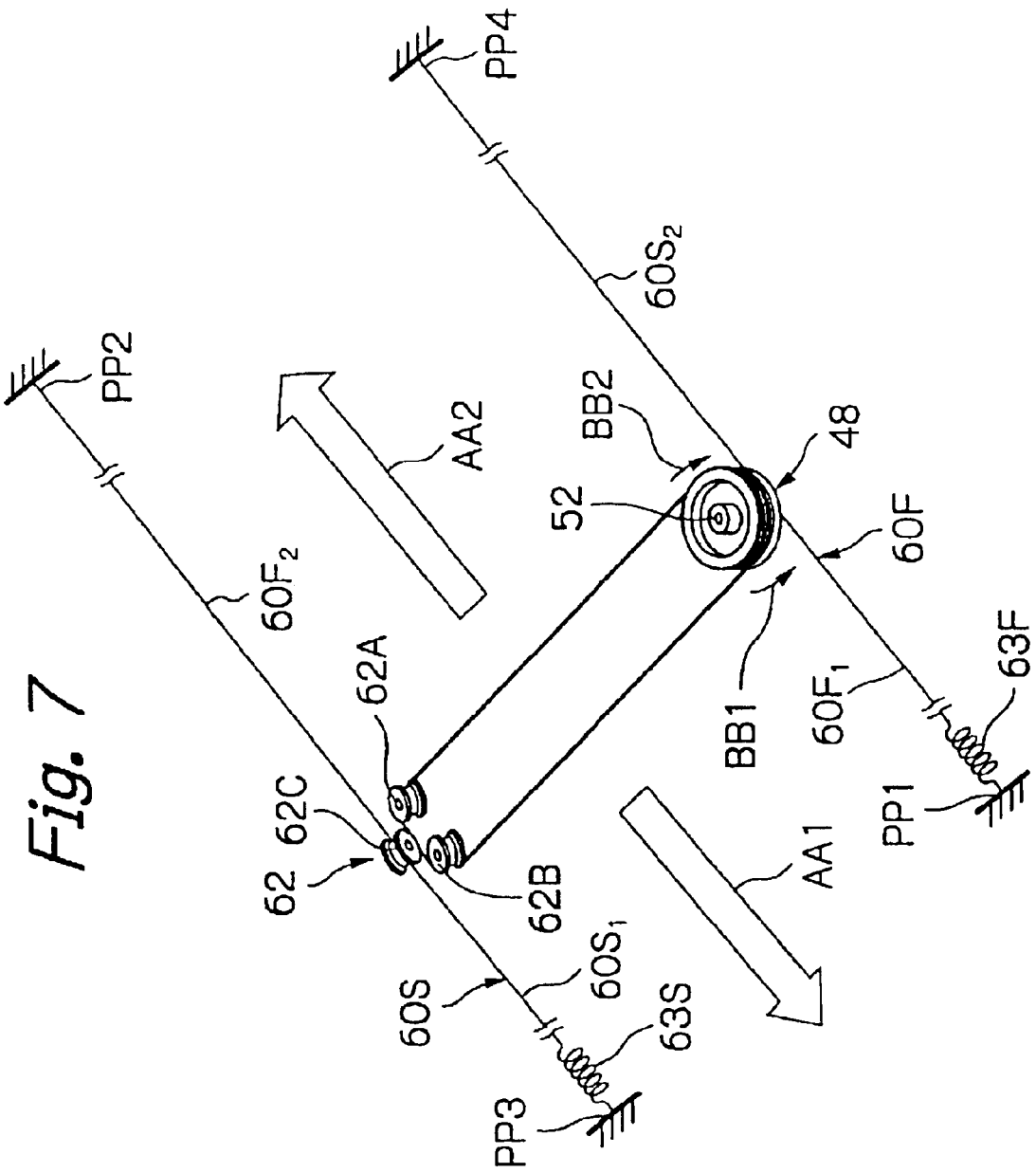
FIG. 7 is a schematic perspective view showing a whole arrangement of the second embodiment of the wire-driving system according to the present invention.

With reference to FIG. 7, a whole arrangement of the second embodiment of the wire-driving system according to the present invention is schematically shown. The wiring-driving system is incorporated in the image reader to move the image scanner unit 40 along the guide path (AA1, AA2).

Figure 8:
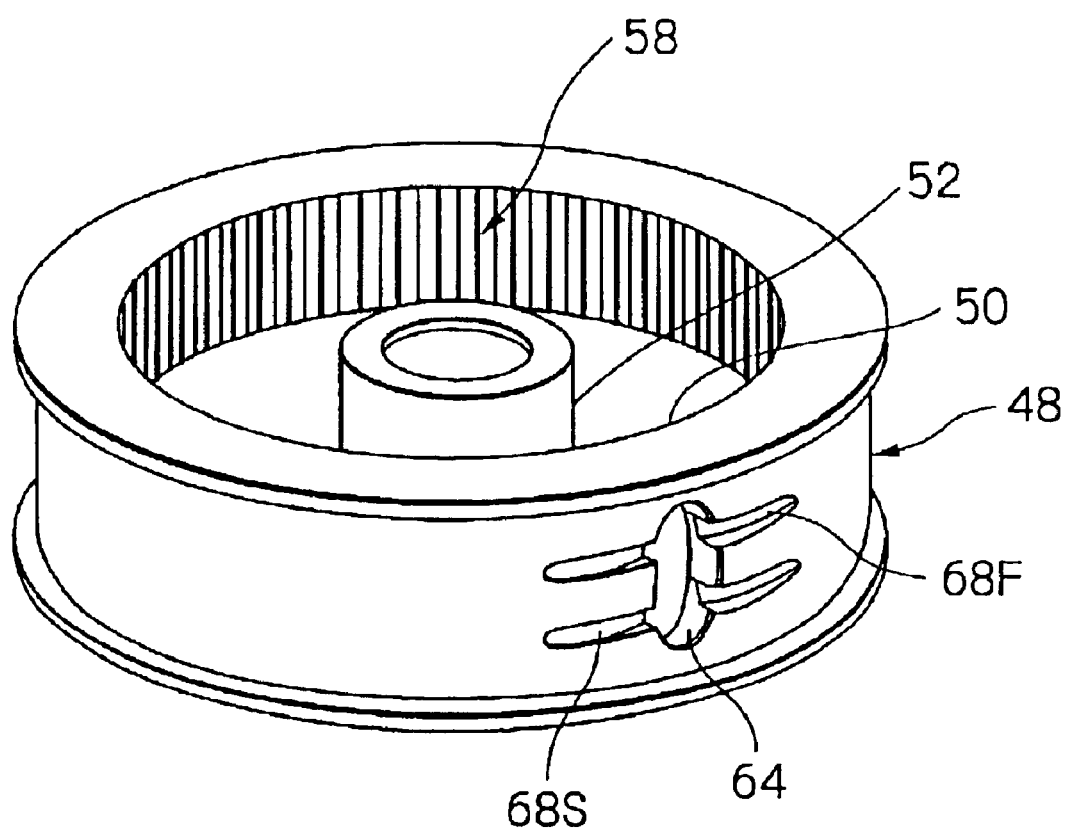
FIG. 8 is a perspective view of a drive drum member forming a part of the second embodiment of the wire-driving system.

Similar to the first embodiment, the wire-driving system includes a drive drum member 48, which is rotatably provided on the bottom of the frame housing 44 at its end side beside the guide rail 42, as shown in FIG. 6. As best shown in FIG. 8, an annular recess 50 is formed in the drive drum member 48 such that a central hub 52 is defined therein, and the central hub 52 is rotatably mounted on a vertical shaft 53, which is protruded from the bottom of the frame housing 14, as shown in FIG. 6. Namely, the drive drum member 48 is rotatable around the longitudinal axis of the vertical shaft 53, which is perpendicular to the guide path (AA1, AA2) of the image scanner unit 40.

As shown in FIG. 6, the wire-driving system also includes an electric drive motor 54 provided in the frame housing 44, and a pinion 56 is securely mounted on an output shaft of the electric drive motor 54. On the other hand, as best shown in FIG. 7, the drive drum member 48 has an inner annular gear 58 formed in a peripheral wall of the annular recess 50, and the pinion 56 is engaged with the inner annular gear 58, as shown in FIG. 6, whereby the drive drum member 48 is rotationally driven by the electric drive motor 54.

Note, in FIG. 5, although the drive drum member 48 is illustrated at a proper position with respect to the image scanner unit 40, the vertical shaft 53 and the pinion 56 are omitted from FIG. 5 to avoid complexity of illustration.

As is apparent from FIGS. 5 and 7, the wire-driving system also comprises first and second wire cables 60F and 60S associated with the drive drum member 48. In particular, the first wire cable 60F is partially wound around the drive drum member 48 such that a first cable section $60F_1$ and a second cable section $60F_2$ are extended from the drive drum member 48, and the second wire cable 60S is partially wound around the drive drum member 48 such that a first cable section $60S_1$ and a second cable section $60S_2$ are extended from the drive drum member 48.

In the second embodiment, the wire-driving system further comprises a wire-cable deflector 62 provided at the other end of the frame housing 44. As shown in FIG. 7, the wire-cable deflector 62 is composed of three pulleys 62A, 62B, and 62C. The pulleys 62A and 62B are aligned with each other along the guide path (AA1, AA2), and each of the pulleys 62A and 62B is rotatable around a rotational axis, which is in parallel with the rotational axis of the drive drum member 48. The pulley 62C is provided between the pulleys 62A and 62C, and is rotatable around a rotational axis, which is perpendicular to the rotational axis of the drive drum member 48.

Figure 9:
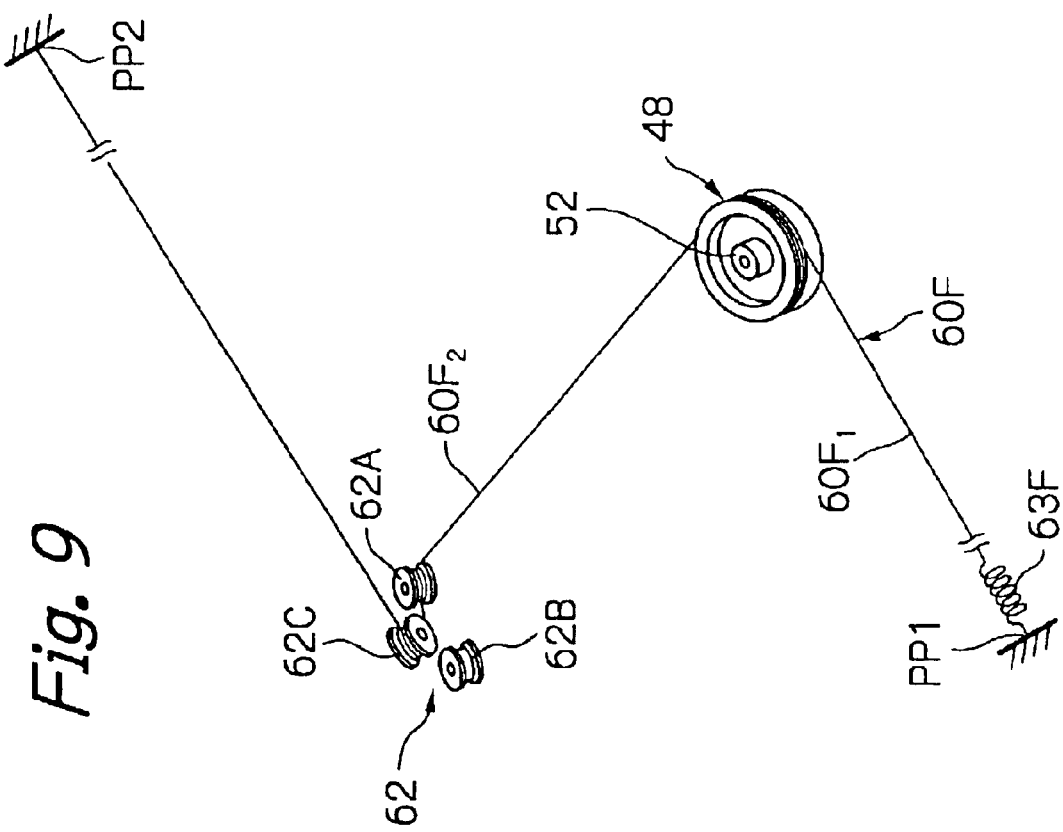
FIG. 9 is a schematic perspective view, similar to FIG. 7, from which a second wire cable is omitted to thereby avoid complexity of illustration.

As best shown in FIG. 9, the end of the first cable section $60F_1$ of the first wire cable 60F is securely attached to a first fixed point PP1 through the intermediary of a first spring tensioner 63F. On the other hand, the second cable section $60F_2$ of the first wire cable 60F is threaded through the pulleys 62A and 62C, and is then deflected such that the end of the second cable section $60F_2$ is securely attached to a second fixed point PP2.

Figure 10:
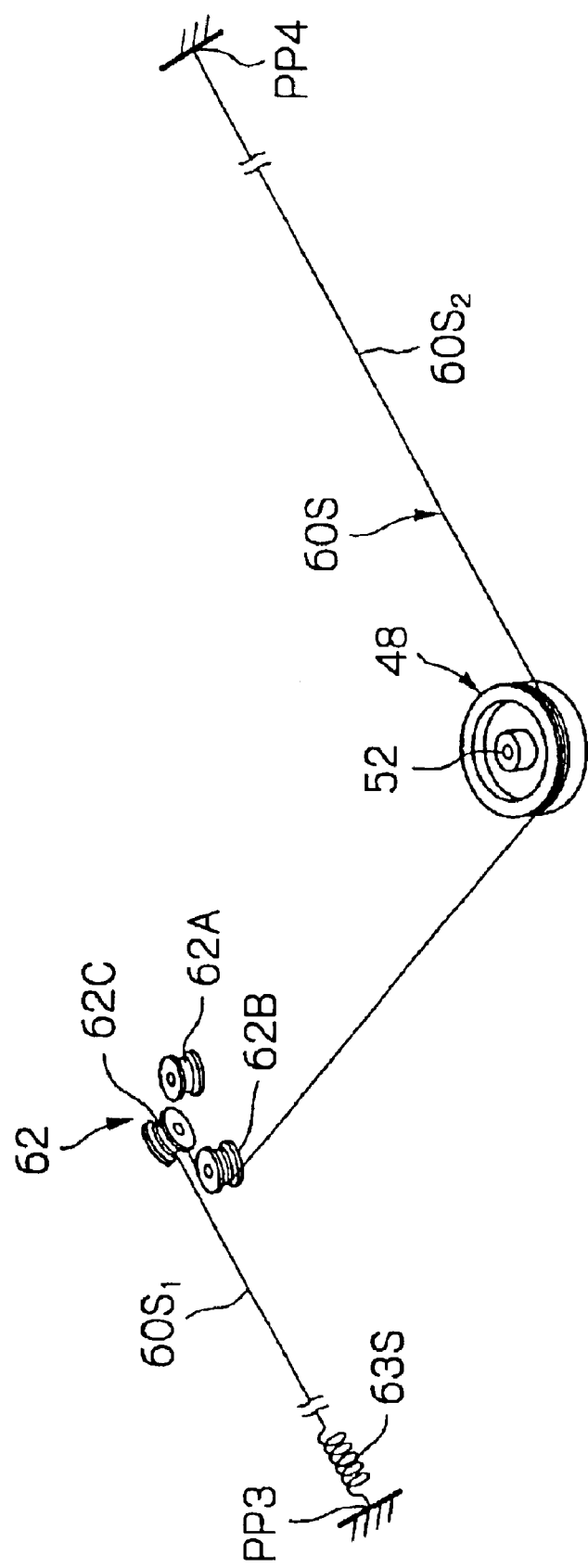
FIG. 10 is a schematic perspective view, similar to FIG. 7, from which a first wire cable is omitted to thereby avoid complexity of illustration.

On the other hand, as best shown in FIG. 10, the end of the first cable section $60S_1$ of the second cable 60S is securely attached to a third fixed point PP3 through a second spring tensioner 63S. The first cable section $60S_1$ of the second cable 60S is threaded through the pulleys 62B and 62C, and is then deflected so as to be wound around the drive drum member 48. On the other hand, the end of the second cable section $60S_2$ of the second wire cable 60S is securely attached to a fourth fixed point PP4.

Note, in this second embodiment, the first, second, third, and fourth fixed points PP1, PP2, PP3, and PP4 are presented by a frame structure of the image reader, and are selected so as to be diagonally arranged with respect to the guide path (AA1, AA2) for the image scanner unit 40, as is apparent from FIG. 7.

Figure 11:
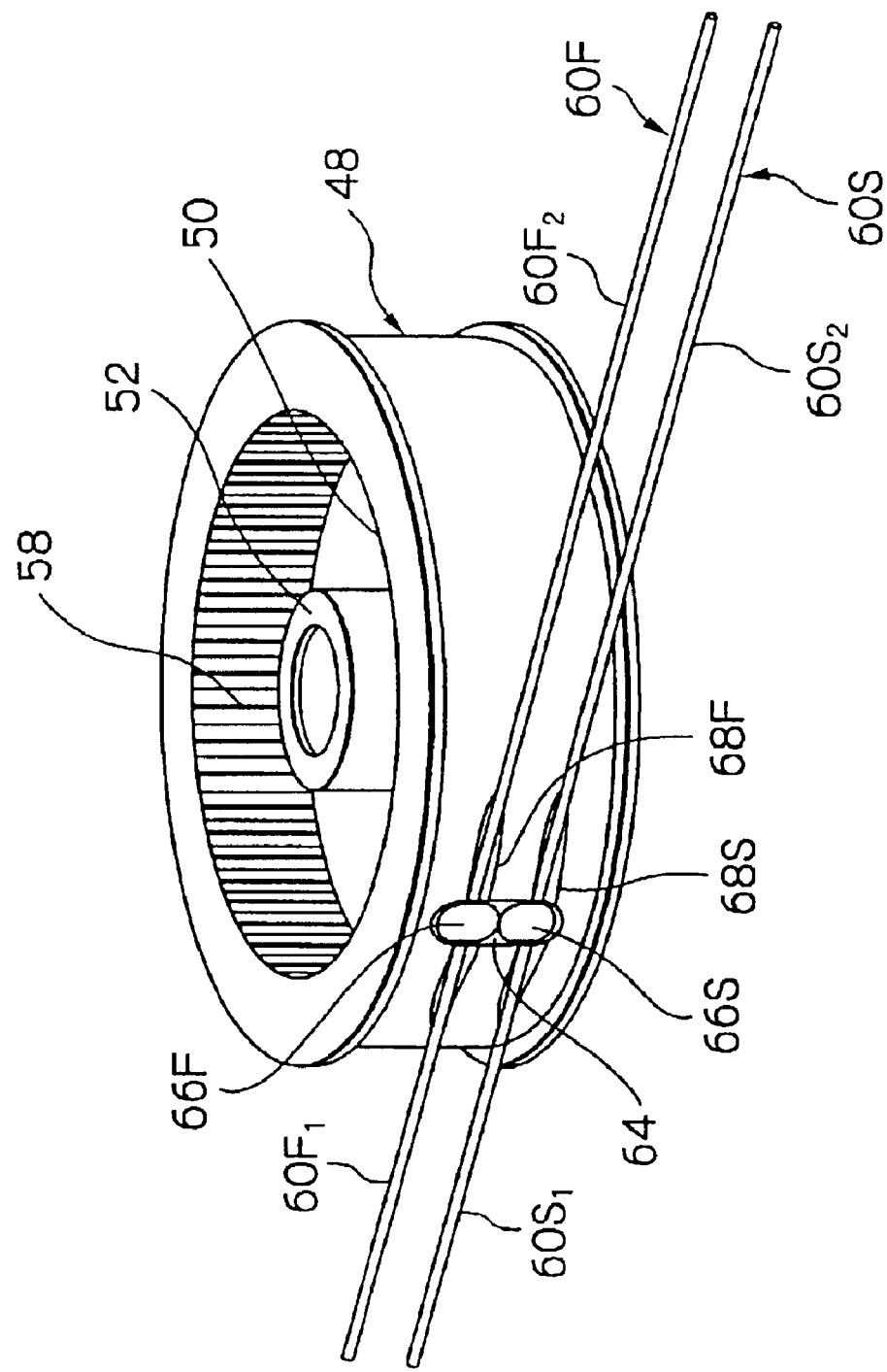
FIG. 11 is a perspective view of the drive drum member, similar to FIG. 7, in which the first and second wire cables are securely attached to the drive dram member, using two hemispherical plug elements.

Preferably, as shown in FIG. 11, the first wire cable 60F is securely attached to the drive drum member 48 at a middle point between the ends thereof such that the first and second cable sections $60F_1$ and $60F_2$ are defined as respective ones extending from the middle point to the ends of the first wire cable 60F. Similarly, the second wire cable 60S is securely attached to the drive drum member 48 at a middle point between the ends thereof such that the first and second cable sections $60S_1$ and $60S_2$ are defined as respective ones extending from the middle point to the ends of the second wire cable 60S.

For the secure attachment of the first and second wire cables 60F and 60S to the drive drum member 48, as shown in FIGS. 8 and 11, an oval recess 64 is formed in an outer peripheral wall of the drive drum member 48, and two hemispherical plug elements 66F and 66S are used. Namely, each of the hemispherical plug elements 66F and 66S is substantially identical to the hemispherical plug element 36 shown in FIG. 4, and the middle points of the first and second wire cables 60F and 60S are securely attached to the drive drum member 48 by inserting the respective plug elements 66F and 66S with the wire cables 60F and 60S in the oval recess 64 in substantially the same manner as the first embodiment.

Similar to the first embodiment, as shown in FIGS. 7 and 11, two grooves 68F and 68S are formed in the outer peripheral wall of the drive drum member 48 so as to cross the oval recess 64, and thus each of the first and second wire cables 60F and 60S is prevented from being subjected to shearing stress when the corresponding plug element (66F, 66S) with the wire cable (60F, 60S) is inserted into the oval recess 64 because the respective first and second wire cables 60F and 60S are received in the grooves 68F and 68S, as shown in FIG. 11.

After the insertion of the plug elements 66F with the first wire cable 60F into the oval recess 64, the respective first and second cable sections $60F_1$ and $60F_2$ of the first wire cable 60F are wound around the drive drum member 48 in reverse directions with respect to each other. Similarly, after the insertion of the plug elements 66S with the second wire cable 60S into the oval recess 64, the respective first and second cable sections $60S_1$ and $60S_2$ of the second wire cable 60S are wound around the drive drum member 48 in reverse directions with respect to each other.

As stated above, the wire cable deflector 62 is composed of the set of three pulleys 62A, 62B, and 62C. Each of the pulleys 62A and 62B is rotatably mounted on a vertical shaft 70, which is protruded from the bottom of the frame housing 44, as shown in FIG. 6. Note, in FIG. 6, only one pulley 62B is visible. In short, each of the pulleys 62A and 62B is rotatable around the axis of the vertical shaft 70, which is in parallel with the rotational axis of the shaft 53 for the drive drum member 48. Also, the pulley 62C is rotatably mounted on a horizontal shaft 72, which is protruded from an end face of the frame housing 14, as shown in FIG. 6. In short, the pulley 62C is rotatable around the axis of the horizontal shaft 72, which is perpendicular to the longitudinal axis of the shaft 53 for the drive drum member 48.

As is apparent from FIG. 7, both the first cable section $60F_1$ of the first wire cable 60F and the second cable section $60S_2$ of the second wire cable 60S and both the first cable section $60S_1$ of the second wire cable 60S and the second cable section $60F_2$ of the first wire cable 60F are tensionally stretched along respective sides of the guide path (AA1, AA2) for the image scanner unit 40, due to the provision of the first and second spring tensioners 63F and 63S. In other words, both the first cable section $60F_1$ of the first wire cable 60F and the second cable section $60S_2$ of the second wire cable 60S are substantially aligned with each other so as to be in parallel with the guide path (AA1, AA2) for the image scanner unit 40, and both the first cable section $60S_1$ of the second wire cable 60S and the second cable section $60F_2$ of the first wire cable 60F are substantially aligned with each other so as to be in parallel with the guide path (AA1, AA2) for the image scanner unit 40.

With the above-mentioned arrangement, for example, when the drive drum member 48 is rotationally driven by the electric drive motor 54 in a counterclockwise direction indicated by an arrow BB1 in FIG. 7, the first cable sections $60F_1$ and $60S_1$ of the first and second wire cable 60F and 60S are wound around the drive drum member 48, and simultaneously the second cable sections $60F_2$ and $60S_2$ of the first and second wire cable 60F and 60S are unwound from the drive drum member 48. Thus, the elongated image scanner unit 40 is pulled at its ends by the first cable sections $60F_1$ and $60S_1$ of the first and second wire cable 60F and 60S, so as to be moved along the guide rails 12 in the direction indicated by the arrow AA1.

On the other hand, when the drive drum member 48 is rotationally driven by the electric drive motor 54 in a clockwise direction indicated by an arrow BB2 in FIG. 7, the first cable sections $60F_1$ and $60S_1$ of the fist and second wire cable 60F and 60S are unwound from the drive drum member 48, and simultaneously the second cable sections $60F_2$ and $60S_2$ of the first and second wire cable 60F and 60S are wound around the drive drum member 48. Thus, the elongated image scanner unit 40 is pulled at its ends by the second cable sections $60F_2$ and $60S_2$ of the first and second wire cable 60F and 60S, so as to be moved along the guide rails 12 in the direction indicated by the arrow AA2.

In short, in the second embodiment, since the wound wire cable sections ($60F_1$ and $60S_1$; $60F_2$ and $60S_2$) act on the ends of the elongated image scanner unit 40 to pull it along the guide rails 42 and 43, it is possible to ensure the stable and smooth movement of the elongated image scanner unit 40 along the guide path (AA1, AA2).

Similar to the first embodiment, a movement range, in which the elongated image scanner unit 40 can be moved along the guide path (AA1, AA2), is determined by winding turns of each wire cable (60F, 60S) around the drive drum member 48, and the winding turns of the first wire cable 60F is equal to that of the second wire cable 60S. Namely, the movement range of the image scanner unit 40 is equivalent to a total of both a length of the winding turns of each first cable section ($60F_1$, $60S_1$) and a length of the winding turns of each second cable section ($60F_2$, $60S_2$).

For example, when the image scanner unit 40 is positioned at a center between the terminal ends of the movement range (i.e. the guide path), the length of the winding turns of each first cable section ($60F_1$, $60S_1$) and the length of the winding turns of each second cable section ($60F_2$, $60S_2$) are equal to each other, and each length corresponds to one half of the movement range. Also, for example, when the image scanner unit 40 is moved to the terminal end or the movement range in the direction indicated by the arrow AA2, each first cable section ($60F_1$, $60S_1$) is completely unwound from the drive drum member 48, and the length of the winding turns of each second cable section ($60F_2$, $60S_2$) around the drive drum member 48 corresponds to the full movement range. On the other hand, when the image scanner unit 40 is moved to the terminal end of the movement range in the direction indicated by the arrow AA1, each second cable section ($60F_2$, $60S_2$) is completely unwound from the drive drum member 48, and the length of the winding turns of each first cable section ($60F_1$, $60S_1$) around the drive drum member 48 corresponds to the full movement range.

In the second embodiment, the drive drum member 48 has an annular cable-winding area, around which the first and second wire cables 60F and 60S are partially wound, and a width of the annular cable-winding area is defined as a distance measured between opposite flanges of the drive drum member 48. In this case, preferably, the grooves 68F and 68S should be positioned such that the width of the annular cable-winding area is divided into three equal sections, as shown in FIGS. 8 and 11, and the first and second wire cables 60F and 60S should be orderly wound around the drive drum member 48 such that the winding and unwinding of the first wire cable 60F and the winding and unwinding of the second wire cable 60S do not interfere with each other, as best shown by way-of example in FIGS. 12A and 12B.

In particular, the first cable section $60F_1$ of the first wire cable 60F is wound around the drive drum member 48 such that the winding turns of the first cable section $60F_1$ are shifted downward from the groove 68F, and the second cable section $60F_2$ of the first wire cable 60F is wound around the drive drum member 48 such that the winding turns of the second cable section $60F_2$ are shifted upward from the groove 68F. On the other hand, the first cable section $60S_1$ of the second wire cable 60S is wound around the drive drum member 48 such that the winding turns of the first cable section $60S_1$ are shifted downward from the groove 68S, and the second cable section $60S_2$ of the second wire cable 60S is wound around the drive drum member 48 such that the winding turns of the second cable section $60S_2$ are shifted upward from the groove 68S.

With the arrangement as mentioned above, when the drive drum member 48 is rotationally driven in the counterclockwise direction indicated by the arrow BB1 (FIG. 7), i.e. when the image scanner unit 40 is moved in the direction indicated by the arrow AA1, as shown in FIG. 12A, the first cable section $60F_1$ of the first wire cable 60F is wound around the drive drum member 48, but the second cable section $60S_2$ of the second cable section 60S, adjacent to the first cable section $60F_1$ of the first wire cable 60F, is unwound from the drive drum member 48. On the other hand, when the drive drum member 48 is rotationally driven in the clockwise direction indicated by the arrow BB2 (FIG. 7), i.e. when the image scanner unit 40 is moved in the direction indicated by the arrow AA2, as shown in FIG. 12B, the first cable section $60F_1$ of the first wire cable 60F is unwound from the drive drum member 48, but the second cable section $60S_2$ of the second cable section 60S, adjacent to the first cable section $60F_1$ of the first wire cable 60F, is wound around the drive drum member 48.

Accordingly, it is possible to orderly and smoothly perform both the winding and unwinding of the first wire cable 60F and the winding and unwinding of the second wire cable 60S without interfering with each other.

As is apparent from the foregoing, according to the present invention, it is possible to compactly and simply arrange a wire-driving system in various machines, such as a copying machine, an image scanner, a facsimile machine, a printer and so on, to drive and move a movable unit along a guide path, because a drive source, such as an electric drive motor, for driving the movable unit is provided on the movable unit itself, and because it is unnecessary to provide an arrangement of pulleys in the machine.

Also, according to the present invention, it is possible to advantageously arrange a wire-driving system in a machine to stably and smoothly drive and move an elongated movable unit along a guide path, because wire cables can act on the ends of the elongated movable unit to pull it along the guide path.

Finally, it will be understood by those skilled in the art that the foregoing description is of preferred embodiments of the processes and device, and that various changes and modifications may be made to the present invention without departing from the spirit and scope thereof.

What is claimed is:

1. A wire-driving system that drives and moves an elongated movable unit along a guide path defined by a first side and a second side opposite to each other, which system comprises:

a drive drum member rotatably provided on a first end of said elongated movable unit so as to be rotated around a rotational axis which is perpendicular to a movement direction of said elongated movable unit;

a drive source provided in said elongated movable unit and operationally connected to said drive drum member so as to be rotationally driven in either a first rotational direction or a second rotational direction;

a first wire cable having a first end and a second end, and partially wound around said drive drum member such that a first cable section and a second cable section are extended from said drive drum member;

a second wire cable having a first end and a second end, and partially wound around said drive drum member such that a first cable section and a second cable section are extended from said drive drum member;

the first end of said first wire cable and the second end or said second wire cable being securely attached to two fixed points beside terminal ends of the first side or said guide path such that the first cable section of said first wire cable and the second cable section of said second wire cable are tensionally extended along the first side of said guide path; and a wire-cable deflector provided on a second end of said elongated movable unit such that the second cable section of said first wire cable and the first cable section of said second wire cable are threaded through said wire-cable deflector so as to laterally traverse said guide path, whereby the second end of said first wire cable and the first end of said second wire cable are securely attached to two fixed points beside ends of the second side of said guide path such that the second cable section of said first wire cable and the first cable section of said second wire cable are tensionally extended along the second side of said guide path, wherein both the first cable sections of said first and second wire cables and both the second cable sections of said first and second wire cables are respectively wound around and unwound from said drive drum member during the rotation of said drive drum member in the first rotational direction by said drive source, and both the first cable sections of said first and second wire cables and both the second cable sections of said first and second wire cables are respectively unwound from and wound around said drive drum member during the rotation of said drive drum member in the second rotational direction by said drive source, resulting in the movement of said elongated movable unit along said guide path.

2. A wire-driving system as set forth in claim 1, wherein said first wire cable is securely attached to said drive drum member at a middle point between the first and second ends of said first wire cable such that said first and second cable sections are defined as respective ones extending from said middle point to the first and second ends of said first wire cable, the respective first and second cable sections of said first wire cable being wound around said drive drum member in reverse directions with respect to each other, and wherein said second wire cable is securely attached to said drive drum member at a middle point between the first and second ends of said second wire cable such that said first and second cable sections are defined as respective ones extending from said middle point to the first and second ends of said second wire cable, the respective first and second cable sections of said second wire cable being wound around said drive drum member in reverse directions with respect to each other.

3. A wire-driving system as set forth in claim 1, wherein a length of the winding turns of said first wire cable is equal to that of the winding turns of said second wire cable, and a movement range, in which said elongated movable unit is moved along said guide path, is equivalent to the length of the winding turns of each wire cable around said drive drum member.

4. A wire-driving system as set forth in claim 1, wherein said wire-cable deflector comprises first and second pulleys, each of which is rotatable around a rotational axis parallel with the rotational axis of said drive drum member, and a third pulley which is rotatable around a rotational axis perpendicular to the rotational axis of said drive drum member; the second cable section is threaded through said first and third pulleys, and is deflected such that the end of the second cable section is securely attached to the corresponding fixed point; and the first cable section is threaded through said second and third pulleys, and is deflected so as to be wound around said drive drum member.

5. A wire-driving system as set forth in claim 1, wherein the first and second wire cables are orderly wound around the drive drum member such that the winding and unwinding of the first wire cable and the winding and unwinding of the second wire cable do not interfere with each other.

6. A wire-driving system as set forth in claim 5, wherein both the first cable sections of said first and second wire cables are wound around the drive drum member such that the winding turns of the first cable sections are shifted in one direction along the rotational axis of said drive drum member, and both the second cable sections of the first and second wire cable are wound around the drive drum member such that the winding turns of the second cable section are shifted in a reverse direction along the rotational axis of said drive drum member, whereby the two adjacent cable sections of said first and second wire cables are wound around and unwound from the drive drum member when said drive drum member is driven in said first rotational direction, and whereby the two adjacent cable sections of said first and second wire cables are unwound from and wound around the drive drum member when said drive drum member is driven in said second rotational direction.

7. An image reader comprising:

an elongated image scanner unit that is movable along a guide path defined by a first side and a second side opposite to each other;

a drive drum member rotatably provided on a first end of said elongated image scanner unit so as to be rotated around a rotational axis which is perpendicular to a movement direction of said elongated image scanner unit;

a drive source provided in said elongated image scanner unit and operationally connected to said drive drum member so as to be rotationally driven in either a first rotational direction or a second rotational direction;

a first wire cable having a first end and a second end, and partially wound around said drive drum member such that a first cable section and a second cable section are extended from said drive drum member;

a second wire cable having a first end and a second end, and partially wound around said drive drum member such that a first cable section and a second cable section are extended from said drive drum member;

the first end of said first wire cable and the second end of said second wire cable being securely attached to two fixed points beside terminal ends of the first side of said guide path such that the first cable section of said first wire cable and the second cable section of said second wire cable are tensionally extended along the first side of said guide path; and a wire-cable deflector provided on a second end of said elongated image scanner unit such that the second cable section of said first wire cable and the first cable section of said second wire cable are threaded through said wire-cable deflector so as to laterally traverse said guide path, whereby the second end of said first wire cable and the first end of said second wire cable are securely attached to two fixed points beside ends of the second side of said guide path such that the second cable section of said first wire cable and the first cable section of said second wire cable are tensionally extended along the second side of said guide path, wherein both the first cable sections of said first and second wire cables and both the second cable sections of said first and second wire cables are respectively wound around and unwound from said drive drum member during the rotation of said drive drum member in the first rotational direction by said drive source, and both the first cable sections of said first and second wire cables and both the second cable sections or said first and second wire cables are respectively unwound from and wound around said drive drum member during the rotation of said drive drum member in the second rotational direction by said drive source, resulting in the movement of said elongated image scanner unit along said guide path.

8. An image reader as set forth in claim 7, further comprising a pair of guide rails on which said elongated image scanner unit is slidably mounted, such that said elongated image scanner unit is movable along said guide path.

9. An image reader as set forth in claim 7, wherein said first wire cable is securely attached to said drive drum member at a middle point between the first and second ends of said first wire cable such that said first and second cable sections are defined as respective ones extending from said middle point to the first and second ends of said first wire cable, the respective first and second cable sections of said first wire cable being wound around said drive drum member in reverse directions with respect to each other, and wherein said second wire cable is securely attached to said drive drum member at a middle point between the first and second ends of said second wire cable such that said first and second cable sections are defined as respective ones extending from said middle point to the first and second ends of said second wire cable, the respective first and second cable sections of said second wire cable being wound around said drive drum member in reverse direction with respect to each other.

10. An image reader as set forth in claim 7, wherein a length of the winding turns of said first wire cable is equal to that of the winding turns of said second wire cable, and a movement range, in which said elongated image scanner unit is moved along said guide path, is equivalent to the length of the winding turns of each wire cable around said drive drum member.

11. An image reader as set forth in claim 7, wherein said wire-cable deflector comprises first and second pulleys, each of which is rotatable around a rotational axis parallel with the rotational axis of said drive drum member, and a third pulley which is rotatable around a rotational axis perpendicular to the rotational axis of said drive drum member; the second cable section is threaded through said first and third pulleys, and is deflected such that the end of the second cable section is securely attached to the corresponding fixed point; and the first cable section is threaded through said second and third pulleys, and is deflected so as to be wound around said drive drum member.

12. An image reader as set forth in claim 7, wherein the first and second wire cables are orderly wound around the drive drum member such that the winding and unwinding of the first wire cable and the winding and unwinding of the second wire cable do not interfere with each other.

13. An image reader as set forth in claim 12, wherein both the first cable sections of said first and second wire cables are wound around the drive drum member such that the winding turns of the first cable sections are shifted in one direction along the rotational axis of said drive drum member, and both the second cable sections of the first and second wire cable are wound around the drive drum member such that the winding turns of the second cable section are shifted in a reverse direction along the rotational axis of said drive drum member, whereby the two adjacent cable sections of said first and second wire cables are wound around and unwound from the drive drum member when said drive drum member is driven in said first rotational direction, and whereby the two adjacent cable sections of said first and second wire cables are unwound from and wound around the drive drum member when said drive drum member is driven in said second rotational direction.

* * * * *